United States Patent [19]

Kimura et al.

[11] Patent Number: 5,130,711
[45] Date of Patent: Jul. 14, 1992

[54] SUBSURFACE TARGET IDENTIFICATION RADAR

[75] Inventors: Noriaki Kimura; Kanji Murasawa; Chihiro Jyomuta; Masuo Konishi, all of Okayama, Japan

[73] Assignee: Mitsui Engineering & Shipbuilding Co., Ltd., Tokyo, Japan

[21] Appl. No.: 801,445

[22] Filed: Dec. 2, 1991

[51] Int. Cl.$^5$ .................... G01S 13/04; H04B 13/02
[52] U.S. Cl. ............................ 342/22; 342/74; 342/82; 342/89; 342/85
[58] Field of Search ............... 342/22, 27, 74, 82, 342/89, 85

[56] References Cited

U.S. PATENT DOCUMENTS

| | | | |
|---|---|---|---|
| 3,967,282 | 6/1976 | Young et al. | 342/22 X |
| 4,062,010 | 12/1977 | Young et al. | 342/22 X |
| 4,706,031 | 11/1987 | Michiguchi et al. | 342/22 X |
| 4,721,961 | 1/1988 | Busignies et al. | 342/22 X |
| 4,746,867 | 5/1988 | Gunton | 342/22 X |

Primary Examiner—John B. Sotomayor
Attorney, Agent, or Firm—Blakely, Sokoloff, Taylor & Zafman

[57] ABSTRACT

Subsurface target identification radar includes an antenna array, a rotary encoder, a radar controller, a polarization switching circuit, and transmitter and receiver circuits. The antenna array is constituted by dipole antennas having plane triangle elements. The antennas are disposed at angular intervals of 120° with respect to a rotated symmetric point of the array. The rotary encoder generates a distance pulse every time the radar travels a presetted distance. The radar controller sequentially generates three switching pulses within one period on the basis of the distance pulse from the rotary encoder. The polarization switching circuit selects an arbitrary dipole antenna as a transmitting antenna from the antenna array, selects an arbitrary dipole antenna, other than the selected antenna, as a receiving antenna, and changes a combination of selected antennas every time the switching pulse is generated by the radar controller. The transmitter and receiver circuits transmit/receive electromagnetic waves through the selected antennas.

2 Claims, 2 Drawing Sheets

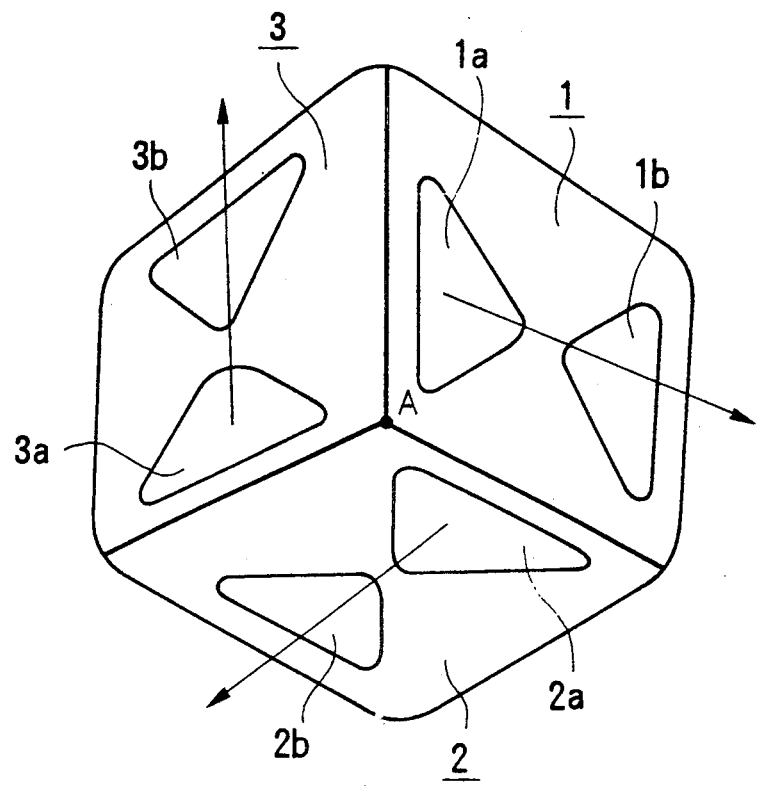
FIG.1
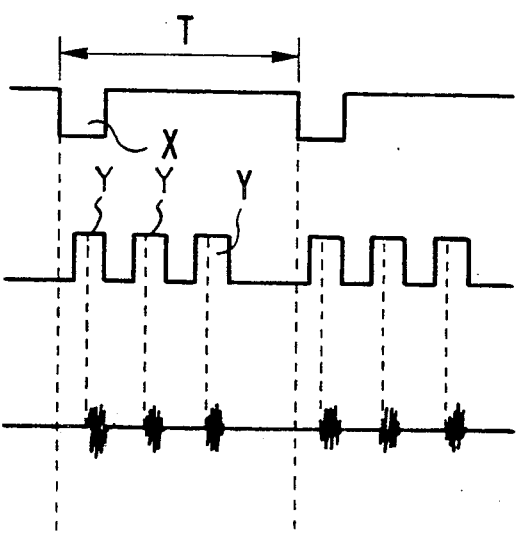
FIG.3A
FIG.3B
FIG.3C

SUBSURFACE TARGET IDENTIFICATION RADAR

BACKGROUND OF THE INVENTION

The present invention relates to an subsurface target identification radar and designed to detect an underground object from the ground surface.

Various conventional methods of searching for an object laid under the ground have been proposed. These methods are basically designed to search for an underground object by radiating a pulse such as an electromagnetic wave or an ultrasonic wave into the ground and detecting the reflected wave from the underground object.

In such conventional methods, however, since the polarization direction of an electromagnetic wave radiated from an antenna is fixed, if the laying direction of an underground object is different from the polarization direction, the reflected wave is weak. In some cases, the reflected wave cannot be detected.

SUMMARY OF THE INVENTION

It is an object of the present invention to provide an underground object search radar which can detect an underground object regardless of its laying direction.

In order to achieve the above object, according to the present invention, there is provided an underground object search radar, comprising an antenna array constituted by three dipole antennas having plane triangle elements, the antennas being disposed at angular intervals of 120° with respect to a rotated symmetric point A of the array, rotary encoder for generating a distance pulse every time the radar travels a presetted distance, a radar controller for sequentially generating three switching pulses within one period on the basis of the distance pulse from the rotary encoder, a polarization switching circuit for selecting an arbitrary dipole antenna as a transmitting antenna from the array, selecting an arbitrary dipole antenna, other than the selected antenna, as a receiving antenna, and changing a combination of selected antennas every time the switching pulse is generated by the radar controller, and transmitter and receiver circuits for transmitting/receiving electromagnetic waves through the selected antennas.

BRIEF DESCRIPTION OF THE DRAWINGS

FIG. 1 is a plan view of an antenna array used for the present invention;

FIGS. 3A to 3C are timing charts respectively showing the waveforms of pulses and a wave at the respective components.

DESCRIPTION OF THE PREFERRED EMBODIMENT

Figure 2:
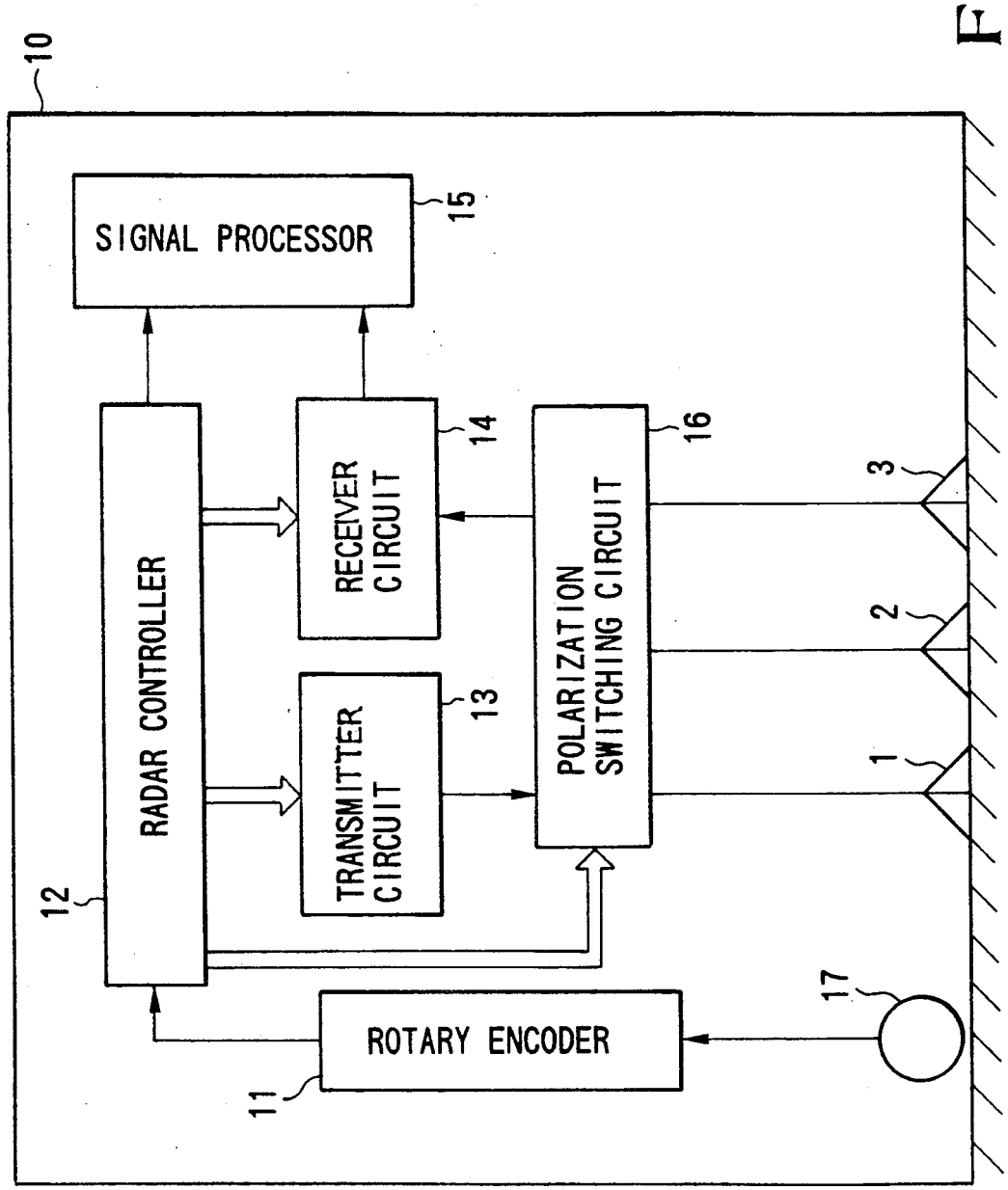
FIG. 2 is a block diagram showing a radar system according to an embodiment of the present invention.

FIG. 1 shows the arrangement of an antenna array used for an apparatus of the present invention. Referring to FIG. 1, reference numerals 1 to 3 denote dipole antennas respectively constituted by pairs of metal plates 1a and 1b, 2a and 2b, and 3a and 3b, as elements. The pair of metal plates of each dipole antenna are arranged such that their vertices oppose each other. The dipole antennas 1 to 3 respectively have polarization direction indicated by arrows in FIG. 1 and are arranged such that the polarization direction are spaced apart from each other at angular intervals of 120° with respect to a rotated symmetric point A of the array.

FIG. 2 shows a radar system 10 for transmitting/receiving waves having presetted frequencies through the antennas 1 to 3. Referring to FIG. 2, reference numeral 11 denotes a rotary encoder for generating a distance pulse shown in FIG. 3A every time the apparatus travels a presetted distance; 12, a radar controller for controlling the overall system; 13, a transmitter circuit for transmitting waves; 14, a receiver circuit for demodulating reflected waves from the underground; 15, a signal processor for acquiring information associated with an underground object by performing presetted signal processing on the basis of signals supplied from the radar controller 12 and the receiver circuit 14; 16, a polarization switching circuit for connecting one of the antennas 1 to 3 to the transmitter circuit 13 and another antenna to the receiver circuit 14; and 17, a wheel.

The apparatus having such an arrangement is operated as follows. As the apparatus travels, the rotary encoder 11 mounted on the wheel 17 or an axle generates distance pulses X shown in FIG. 3A. The distance pulses X are supplied to the radar controller 12. During the period T, the radar controller 12 sequentially generates three polarization switching pulses Y shown in FIG. 3B at a presetted period. These switching pulses Y are supplied to the polarization switching circuit 16. The polarization switching circuit 16 sequentially selects two antennas of the antennas 1 to 3 as a receiving antenna and a transmitting antenna, respectively, as indicated by Table 1.

TABLE 1

|  | For Transmitter | For Receiver |
| --- | --- | --- |
| Mode 1 | antenna 1 | antenna 3 |
| Mode 2 | antenna 3 | antenna 2 |
| Mode 3 | antenna 2 | antenna 1 |

Every time the switching pulse Y is generated, transmitting and receiving antennas are switched, i.e., from the mode 1 to the mode 2, from the mode 2 to the mode 3, and from the mode 3 to the mode 1. As shown in FIG. 3C, the radar controller 12 controls the transmitter circuit 13 to cause it to transmit a wave, as shown in FIG. 3C, for a presetted period of time after the switching pulse Y is generated. When the wave is transmitted, the radar controller 12 simultaneously controls the receiver circuit 14 to operate it for only a presetted period of time equal to the transmission time. A total of the transmitting and receiving time is set to be shorter than the time taken to generate the next switching pulse Y.

In this manner, the polarization of transmitted waves is rotated at angular intervals of 120°, and the polarization of received waves is also rotated at angular intervals of 120°, thereby transmitting waves in all directions and receiving reflected waves from all directions. Since the polarization direction of the waves is sequentially changed, the radar system can detect an underground object in any laying direction, unlike a conventional system in which the fixed polarization direction makes it difficult to detect an underground object depending on its laying direction.

The signals demodulated by the receiver circuit and the distance pulses X, received from the rotary encoder 1 through the radar controller 12, are supplied to the signal processor 15. As a result, information associated with the underground object corresponding to the distance is detected.

As has been described above, according to the present invention, since two of the three antennas, spaced apart from each other at an angular interval of 120°, are sequentially selected to transmit and receive waves, the polarization direction of transmitted and received waves are sequentially changed, thus allowing detection of an underground object regardless of its laying direction.

What is claimed is:

1. An underground object search radar, comprising:
   an antenna array constituted by dipole antennas having plane triangle elements, each of said antennas being disposed at angular intervals of 120° with respect to a rotated symmetric point of the array;
   a rotary encoder for generating a distance pulse every time said radar travels a presetted distance;
   a radar controller for sequentially generating three switching pulses within one period on the basis of the distance pulse from said rotary encoder;
   a polarization switching circuit for selecting an arbitrary dipole antenna as a transmitting antenna from said antenna array, selecting an arbitrary dipole antenna, other than said selected antenna, as a receiving antenna, and changing a combination of selected antennas every time the switching pulse is generated by said radar controller; and
   transmitter and receiver circuits for transmitting-/receiving electromagnetic waves through said selected antennas 2. A radar according to claim 1, wherein said polarization switching circuit selects two of said three dipole antennas as a receiving antenna and a transmitting antenna, respectively, and switching the receiving and transmitting antennas in a presetted order every time the switching pulse is generated.

* * * * *